May 25, 1965     E. L. TURNER     3,184,873

TRANSPARENCY MOUNT

Filed May 28, 1962

INVENTOR.
EUGENE L. TURNER

BY

ATTORNEY

3,184,873
TRANSPARENCY MOUNT
Eugene L. Turner, Brighton, N.Y., assignor to Bausch & Lomb Incorporated, Rochester, N.Y., a corporation of New York
Filed May 28, 1962, Ser. No. 198,322
1 Claim. (Cl. 40—158)

The present invention relates to photographic transparency mounts and, more particularly, to an improved form of transparency mount of the pasteboard or cardboard type.

Conventional pasteboard or cardboard transparency mounts, when new, are quite stiff and function very satisfactorily in automatic slide projectors. However, after transparency mounts have been used for some considerable amount, there is a tendency for them to become more flexible and many times they become deformed or bent so that there is often times a resultant malfunction of the slide projector due to the deformed or bent slide transparency.

It is an object of the present invention to provide means for stiffening cardboard or pasteboard slide transparencies in order to minimize the tendency thereof to become bent or otherwise damaged.

A more particular object of the present invention is to provide in a photographic transparency a continuous sheet metal member having coplanar edges cemented to one surface of the cardboard or pasteboard frame with the sheet metal member defining a box section which is particularly effective in stiffening the slide transparency. The sheet metal member utilized as contemplated herein is thin and the box section does not add so much thickness to the slide transparency mount as to interfere with its normal operation in automatic slide projectors. Consequently, a slide transparency mount constructed in accordance with the principles of the present invention is superior, particularly for applications where the slide is to be used a number of times, to the conventional pasteboard or cardboard mounts without the stiffening metal member.

The foregoing and other objects and advantages of the present invention will become more apparent from the following detailed description, when read in conjunction with the accompanying drawing, wherein.

Figure 1:
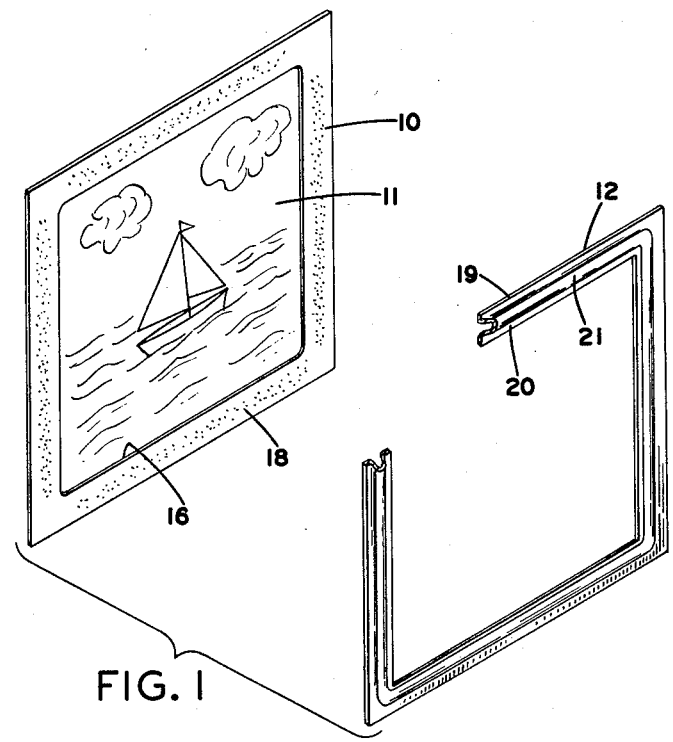
FIG. 1 is an exploded view of a slide transparency mount constructed in accordance with the principles of the present invention.
Figure 2:
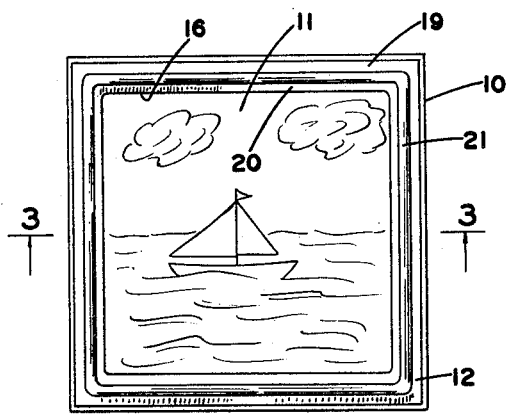
FIG. 2 is a plan view of the transparency mount shown in FIG. 1.

With reference now to the drawing, wherein like reference numerals have been used in the different views to identify identical parts, the slide transparency comprising the subject matter of the present invention comprises a conventional cardboard or pasteboard frame 10 having a transparency 11 mounted therein and having a sheet metal stiffener 12 cemented or otherwise suitably secured to one face of the frame 10.

Figure 3:
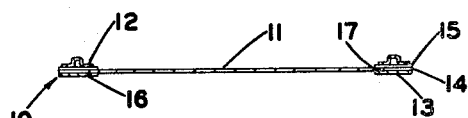
FIG. 3 is a sectional view of the slide transparency taken substantially along the line 3—3 in FIG. 2.

It is contemplated that the cardboard frame 10 may be constructed in any desired manner. One example is illustrated in the drawing, particularly in FIG. 3, and shows three laminations of cardboard 13, 14 and 15. The laminations 13 and 15 are of the same size and are formed with a central aperture 16. The lamination 14 which is sandwiched between laminations 13 and 15 has the same outer dimensions as laminations 13 and 15 but a central opening 17 therein is slightly larger than the central opening 16 in laminations 13 and 15. By providing the larger central opening 17 in the lamination 14, a suitable groove is provided for receiving the periphery of slide transparency 11 therein.

In order to stiffen the frame 10 and thereby obtain the advantages contemplated by the present invention, the sheet metal member 12 is suitably cemented to one face 18 or otherwise suitably secured to one face 18 of the frame 10. It will be noted that the sheet metal member 12 is formed with coplanar edges 19 and 20 for facilitating cementing the same to the side of frame 10, there being an interconnecting box section 21 between the coplanar portions 19 and 20. The box section, of course, effectively stiffens the metal member 12 and has the effect of stiffening the frame 10 and minimizing the tendency for the frame to become bent during handling and during use of the slide transparency.

It is contemplated that changes and modifications may be made in the present invention without departing from the spirit or scope thereof.

What is claimed is:

An assembly comprising a photographic transparency mounted within a substantially flat frame, the frame having an opening therethrough through which the transparency may be viewed, a continuous metal member having coplanar edge portions cemented to one side surface of said frame and surrounding said frame opening, and said metal member defining a continuous closed channel between said coplanar edge portions and extending around the periphery of said frame for thereby stiffening the assembly.

References Cited by the Examiner
UNITED STATES PATENTS

| 1,691,090 | 11/28 | Tevander | 40—27 |
|---|---|---|---|
| 1,930,217 | 10/33 | Weindel | 40—2 |
| 2,227,973 | 1/41 | Hood | 40—152 |
| 2,841,904 | 7/58 | Jablon | 40—152 |
| 2,917,855 | 12/59 | Schneider | 40—152 |

JEROME SCHNALL, *Primary Examiner.*
T. LENNY, *Examiner.*